(12) United States Patent
Olfert et al.

(10) Patent No.: US 8,833,307 B2
(45) Date of Patent: Sep. 16, 2014

(54) CALF CAPTURING CART

(71) Applicants: Kenneth H. Olfert, Hays (CA); Johannes P. K. Daniels, Taber (CA)

(72) Inventors: Kenneth H. Olfert, Hays (CA); Johannes P. K. Daniels, Taber (CA)

( * ) Notice: Subject to any disclaimer, the term of this patent is extended or adjusted under 35 U.S.C. 154(b) by 0 days.

(21) Appl. No.: 13/730,652

(22) Filed: Dec. 28, 2012

(65) Prior Publication Data

US 2014/0060446 A1 Mar. 6, 2014

(30) Foreign Application Priority Data

Sep. 4, 2012 (CA) ................................. 2788937

(51) Int. Cl.
 *A01K 1/02* (2006.01)
 *A01K 1/00* (2006.01)

(52) U.S. Cl.
 CPC ............. *A01K 1/0088* (2013.01); *A01K 1/0236* (2013.01); *A01K 1/0245* (2013.01)
 USPC .......................................... 119/519; 119/843

(58) Field of Classification Search
 USPC ......... 119/519, 405, 408, 412, 452, 516, 722, 119/738, 840, 843, 751, 752, 675, 512
 See application file for complete search history.

(56) References Cited

U.S. PATENT DOCUMENTS

| | | | |
|---|---|---|---|
| 2,729,196 A | 1/1956 | Breitenbach | |
| 3,621,819 A | 11/1971 | Hooper | |
| 3,782,559 A * | 1/1974 | Wright | 211/17 |
| 3,787,088 A * | 1/1974 | Dreyer, Sr. | 296/78.1 |
| 3,912,326 A * | 10/1975 | Tass | 296/51 |
| 4,052,080 A | 10/1977 | Hedderich et al. | |
| 4,133,295 A * | 1/1979 | Jones | 119/422 |
| 4,176,621 A * | 12/1979 | Dill | 119/524 |
| 4,449,481 A | 5/1984 | Dear et al. | |
| 4,567,853 A * | 2/1986 | Hayden | 119/725 |
| 5,090,368 A * | 2/1992 | Berghoefer | 119/843 |
| 5,138,981 A | 8/1992 | Akins | |
| 5,140,947 A | 8/1992 | Bruce | |
| 5,372,092 A | 12/1994 | Pederson | |
| 5,469,812 A | 11/1995 | Burks | |
| 5,655,484 A | 8/1997 | Aaberg | |
| 5,752,473 A | 5/1998 | De Roovere | |
| 5,924,385 A * | 7/1999 | Cossel | 119/512 |

(Continued)

FOREIGN PATENT DOCUMENTS

| | | |
|---|---|---|
| CA | 1139165 | 1/1983 |
| CA | 1319878 | 7/1993 |

(Continued)

*Primary Examiner* — Monica Williams
*Assistant Examiner* — Jessica Wong
(74) *Attorney, Agent, or Firm* — Thomas E. Malyszko (57) ABSTRACT

A mobile cart for isolating an animal from a herd has a protective enclosure for housing an operator and the animal, and for concealing and protecting the operator from the herd. The cart has several modes of operation including a drive mode allowing the operator to move the cart toward the animal, a capture mode allowing the operator to capture the animal within the enclosure and conceal it from the herd, and a treatment mode allowing the operator to treat the animal within the enclosure before releasing or moving it elsewhere. In the capture mode the cart's front end may be lifted over the animal to trap it, or a gate may be raised to bring the calf into the enclosure, or both. A rear end basket for holding the captured calf has a screen with multiple positions for controlling visibility into the basket and enclosure.

20 Claims, 10 Drawing Sheets

(56) References Cited

U.S. PATENT DOCUMENTS

| | | |
|---|---|---|
| 6,167,842 B1 | 1/2001 | Akins et al. |
| 6,964,245 B2 | 11/2005 | Beck |
| 7,216,605 B2 | 5/2007 | Cupps |
| 7,389,746 B2 | 6/2008 | Byl et al. |
| 7,685,970 B1 | 3/2010 | Rains |
| 2009/0031963 A1 | 2/2009 | Reiste |
| 2010/0300372 A1 | 12/2010 | Miller |

FOREIGN PATENT DOCUMENTS

| | | |
|---|---|---|
| CA | 2269685 | 6/1998 |
| CA | 2261319 | 2/1999 |
| CA | 2498426 A1 | 9/2006 |
| CA | 2698897 A1 | 1/2011 |

\* cited by examiner

FIG. 10 ively with the herd. The mother cow...

CALF CAPTURING CART

FIELD OF THE INVENTION

The present invention relates to equipment for capturing and isolating an animal from a herd, and in particular to a mobile cart and related method of capturing a calf and isolating it from the mother cow, and to providing the cart operator with a safe environment for treating the captured calf with less risk of attack or injury from the mother cow or herd.

BACKGROUND OF THE INVENTION

Operators such as ranchers and farmers must often isolate one farm animal from a herd of farm animals for treatment such as vaccination, tagging, transport or other reasons, and is commonly required with a newborn calf shortly after birth and periodically afterwards. However, attempts to isolate the calf from the mother cow can be difficult and highly dangerous for the rancher due to the mother cow's natural instinct to protect her calf. The large mother cows can and do react aggressively, and can attack an operator that attempts to approach and isolate or interact with the calf.

Such task is particularly difficult and dangerous in large open areas. Therefore a conventional technique for isolating a calf from its mother is to locate the animals in a pen or fenced area, and for the operator to isolate the calf by driving the mother cow outside the fenced area. However, this process is not only time consuming but also exposes the unprotected operator to attack by the mother cow.

A number of catch-carrier devices have been developed to handle animals for treatment. In one category there are cage-like enclosures that are either towed behind a vehicle or are raised and moved by a tractor or like device. Some of these devices require that the cage be lowered over an animal to trap it, such as in U.S. Pat. Nos. 7,685,970 and 6,964,245, or to drive the animal into the cage through a side gate, such as U.S. Pat. Nos. 7,389,746 and 5,372,092.

These prior art devices suffer from numerous disadvantages. None are designed to be moved by an operator alone from inside the cage, nor for the operator (while inside the cage) to approach a calf unseen so as to scoop the calf into the cage, nor to isolate a calf from the mother's view while the operator treats the calf, nor to manually transport the calf to another location while the mother can see the calf but not the operator.

In another category there are portable animal carriers that are either wheeled by the operator or slide on the ground, such as U.S. Pat. Nos. 5,090,368 and 4,567,853. In addition to suffering substantially the same disadvantages as the earlier noted prior art devices, none of these devices function to protect the operator from the herd, nor cage the calf but merely cradle the calf during transport, nor can the transported calf be hidden from view of its mother or the herd.

What is therefore desired is a an operator propelled device that facilitates the process of trapping and isolating an animal from a herd in a safer and more effective manner, and which overcomes the limitations and disadvantages of existing processes and devices. Preferably the device should form a protective enclosure for the operator to prevent injury from the herd, and should conceal the operator from view as the operator moves the device toward the animal. The operator should be able to trap the animal within the device so as to isolate it from the herd, and be able to treat the animal within the device unseen by the herd. The device should have a basket arrangement for holding the animal and preventing its escape from the device while the operator moves the device and animal to another location. The basket arrangement should provide the operator with the options of keeping the captured animal concealed from the herd (during such transport), of exposing the captured animal to the herd but keeping the operator concealed, and of exposing both the animal and operator to the herd.

SUMMARY OF THE PRESENT INVENTION

According to the present invention, there is provided in one aspect a device in the form of a cart for isolating an animal from a herd comprising:

a rigid frame having opposed front and rear ends each connected to opposed sides defining a protective enclosure with an open base for receiving an operator and the animal and capable of concealing the operator from the herd;

a drive assembly at the rear end to facilitate mobility of the cart; and, a control means at the front end to manipulate the cart between several modes of operation including a drive mode allowing the operator in the enclosure to propel and guide the cart along the ground toward the animal, a capture mode allowing the operator to capture and conceal the animal within the enclosure thereby isolating the animal from the herd, and a treatment mode allowing the operator to treat the captured animal within the enclosure before releasing or moving the captured animal to another location.

BRIEF DESCRIPTION OF THE DRAWING FIGURES

Embodiments of the invention will now be described, by way of example only, with reference to the accompanying drawings, wherein.

LIST OF REFERENCE NUMBERS IN DRAWINGS

10 cart
12 calf
14 operator
16 ground
20 rigid frame
22 enclosure
24 front end
26 rear end
27 opening at 26
28 left side
30 right side
32 base
33 bottom of 20
34 top of 20
36 side panel
38 rear panel
40 wheels
42 axle
44 bucket
46 weigh scale
48 bracket between 28, 30
50 basket
50a inside edge of 50
50b outside edge of 50
52 bars
54 screen
56 top edge of 27
58 bottom edge of 54
60 shield
62 view ports in 60
64 inside surface of 60
70 gate
72 vertical edges of 70
73 vertical tracks on 20
74 front opening
76 view ports on 70
78 slider handle
80 upper edge of 70
82 bottom edge of 70
90 hand grips
92 outside handle

DESCRIPTION OF PREFERRED EMBODIMENTS

The figures show a device, and method, for capturing and isolating an animal from a herd of animals, and is particularly effective at capturing a calf and isolating it from its mother and other cattle (collectively a "herd"). The device is referred to herein as a "cart" and is generally designated by reference numeral 10, while the calf to be captured is indicated by 12. The cart is mobile and is adapted to be propelled and steered from within by an operator 14, such as a rancher. The cart enables the operator to remain concealed within the cart when approaching the calf and to remain concealed from the herd after capturing the calf within the cart.

Figure 1:
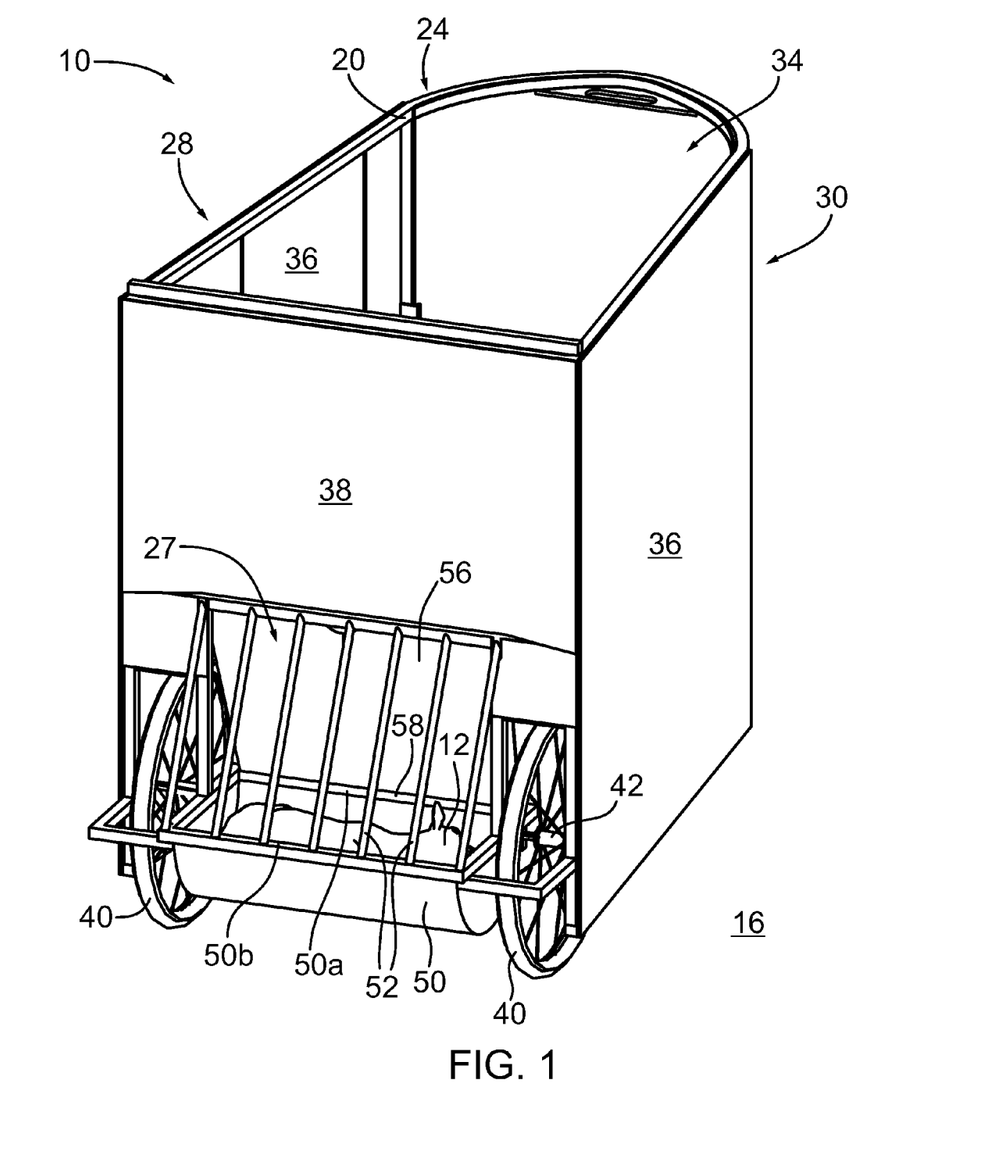
FIG. 1 is a perspective view, from the rear and above, of an animal isolating cart according to a preferred embodiment of the invention showing a captured calf within a basket at the rear end of an enclosure, where a screen is in a first position concealing the interior of the enclosure but visually exposing the basket from outside the cart.
Figure 2:
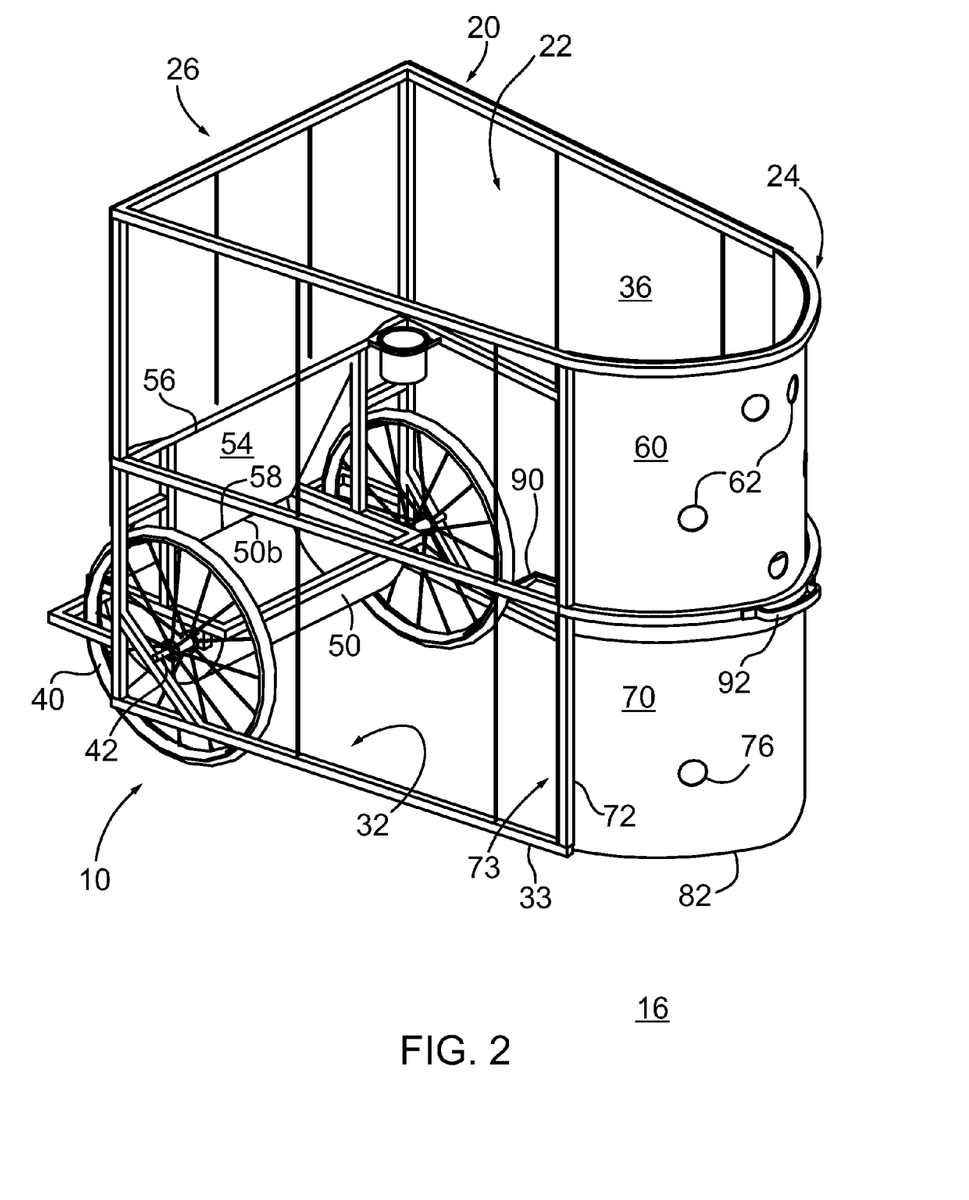
FIG. 2 is a perspective view, from the front and above, of the cart of FIG. 1 made partially transparent by omitting the near side panel for a better view of the enclosure, and shows the screen in a second position concealing both the basket and the interior of the enclosure.
Figure 3:
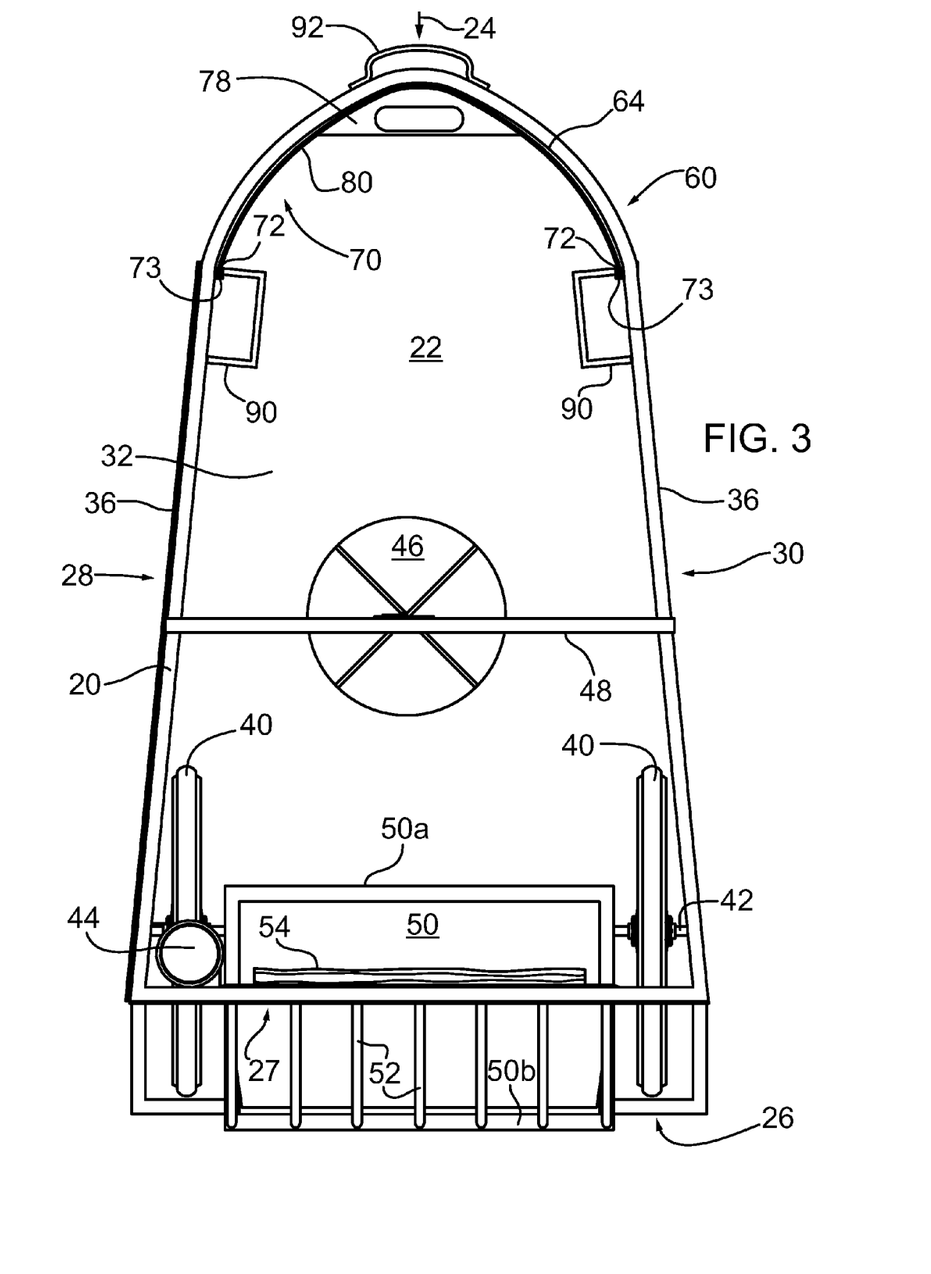
FIG. 3 is a plan view of the cart of FIG. 2 showing the screen rolled up in a third position where the basket and interior of the enclosure are visible from outside the cart at the rear end, and an optional bracket extending between the tops of the opposed sides with a weigh scale hanging therefrom.

Referring first to FIGS. 1-3, the cart 10 has a rigid frame 20 generally rectangular in plan view defining a protective enclosure 22 for the operator. The frame is formed by rigidly connected rows and columns of metal tubing defining a bowed front end 24 and an opposed rear end 26, and opposed left and right sides 28 and 30, respectively, as viewed in FIG. 3. The base 32 is open to the ground 16 for engagement by the operator when within the cart. The top 34, or roof, of the cart is also open, although it may optionally be covered with a weather shield. Each side 28, 30 has one or more panels 36 mounted thereto to conceal the cart operator from view from outside the cart, and likewise the upper part of the rear end 26 is covered by one or more panels 38 to obscure visibility into the enclosure. The panels may be made of a rigid material such as puck board, or from flexible material such as a tarp. Some of the figures show the right side 30 uncovered to better illustrate the cart's interior features and configuration. The covering arrangement at the front end of the cart will be described later.

Figure 5:
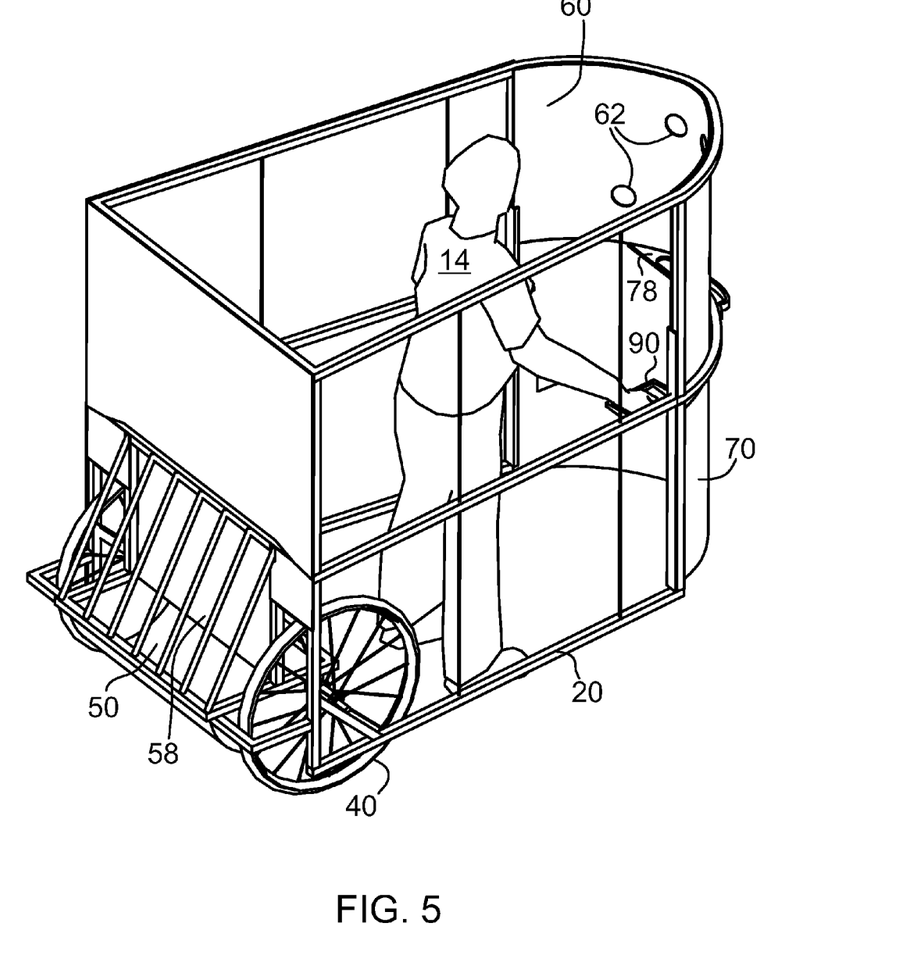
FIG. 5 shows the cart of FIG. 2 in a first drive mode allowing the operator to propel and guide the cart along the ground, and shows the rear screen hanging in an alternate first position concealing the interior of the enclosure but visually exposing a portion of the basket.

The terms "front" or "forward", "rear" or "backward", "left", "right", "top", "bottom" and the like may be used for identifying certain features of the cart relative to the operator when positioned to propel the cart, as in FIG. 5. The use of these terms is not intended to limit the cart's use or orientation. Further, when describing the invention, all terms not defined herein have their common art-recognized meaning.

A drive assembly at the cart's rear end 26 facilitates mobility of the cart along the ground. Two spaced wheels 40 are rotatably mounted to the frame, one adjacent each side 28, 30 in the preferred embodiment. The wheel axles 42 form a pivot point to manipulate the cart in several modes of operation as described later, and to permit the operator to readily lift the front end 24 of the cart sufficiently to enter and exit the enclosure 22 from the front (shown in FIG. 4). The wheels may be replaced with or mounted on skis (not shown) for use over snow. Continuous tracks could also be used, and optionally a small drive motor could be installed for propulsion, but this is not preferred due to weight and cost.

Figure 4:
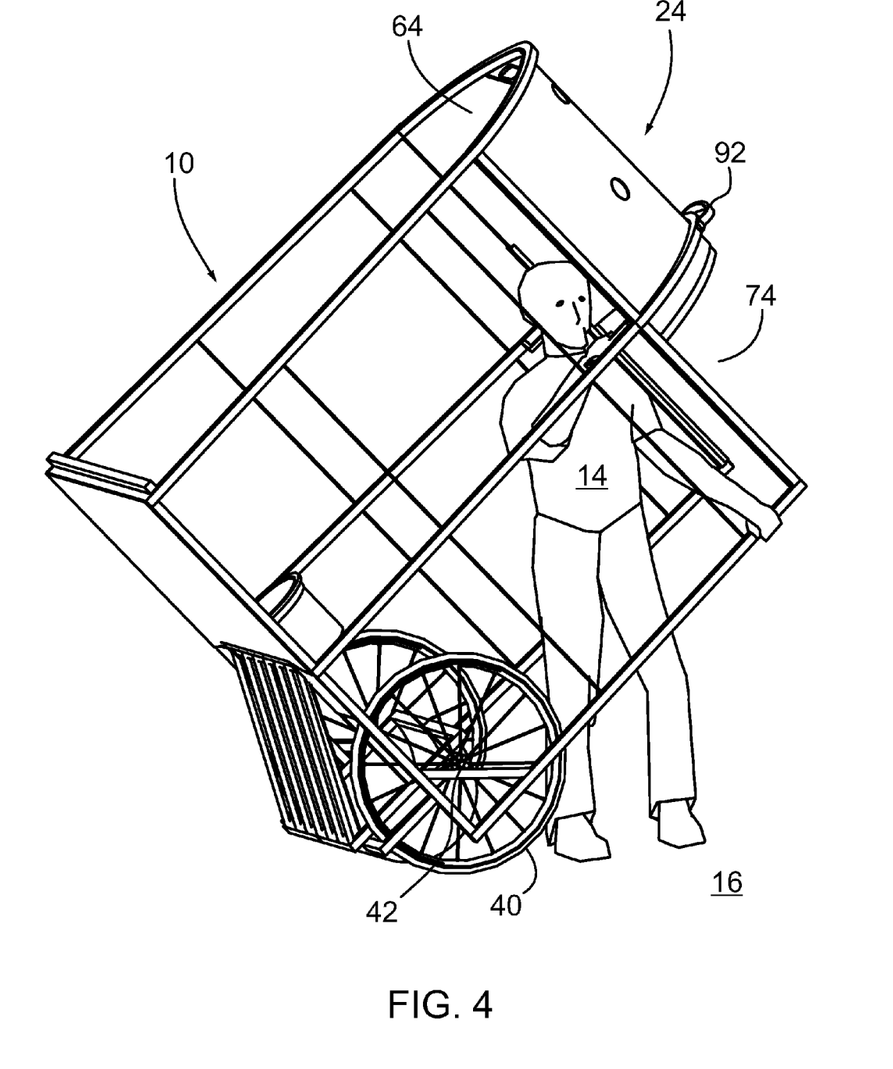
FIG. 4 shows the cart of FIG. 2 with an operator that has lifted the front end of the cart by pivoting it about the rear wheels and has entered the enclosure.

An open top barrel-shaped basket 50 is mounted in an opening 27 at the cart's rear end 26 intermediate the wheels 40. The basket is positioned to avoid impacting the ground when the cart is driven along the ground (FIG. 5) and when lifted for entry or exit by the operator (FIG. 4). The operator has unobstructed access to the basket from within the enclosure to place or remove a captured calf therefrom. However, a security arrangement is provided at the rear of the basket in the form of closely spaced bars 52 to prevent the captured calf from escaping rearwardly out of the basket and cart. The bars allow a mother cow to see and smell the calf, but not to remove the calf from the basket, nor to access the enclosure over the basket and through the rear opening 27.

A movable screen 54 is mounted above the basket 50 to control exterior visibility into the basket and enclosure, particularly after the calf is captured. In the preferred embodiment the screen is a flexible flap connected (either permanently or removably) to a top edge 56 of the opening 27 above the basket. The bottom edge 58 of the flap can be advantageously moved by the operator between several positions. In a first position the flap's bottom edge is removably secured (using snaps, Velcro™ or other suitable means) to the basket's inside edge 50a to visually expose the basket and its contents, but not the enclosure, from outside the cart (FIG. 1). In this position the mother cow may see the calf within the basket but not the operator within the enclosure. In a second position the entire enclosure, including the basket, is concealed from view by removably securing the flap's bottom edge 58 to the basket's outside edge 50*b* (FIG. 2). In this position the mother cow might smell the calf within the enclosure but can not see it nor the operator. In a third position the flap may be rolled up (FIG. 3) or removed so as to visually expose the basket as well as the operator through the rear end opening 27. In a variant of the first position, the flap may be left dangling with its bottom unattached to the basket (FIG. 5), in which case the basket is only partially visible but the operator remains substantially or fully obstructed from view through the opening 27.

Figure 10:
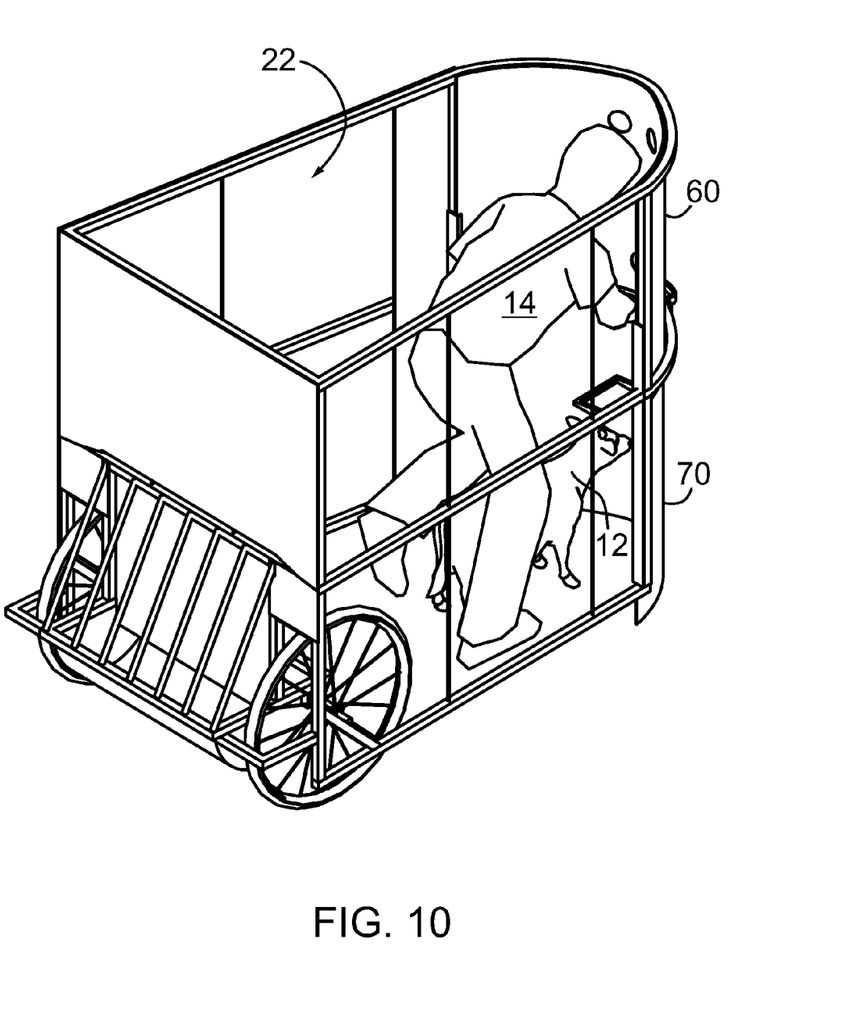

The enclosure 22 should be sized to comfortably house the operator 14 and the captured calf 12 (FIG. 10) and be of adequate height to substantially conceal a standing or slightly crouched operator (FIG. 8), depending on the operator's height. The operator should have ample room to move within/about the enclosure to treat the calf, and to manipulate the calf into the basket 50 for transport to another location. Optionally, one or more receptacles may be located within the enclosure for convenient storage of tools and items needed by the operator for treating the calf and operating the cart. For example, one such receptacle, in the form of a bucket 44, is shown removably mounted to the frame 20 at a rear corner of the enclosure (FIGS. 2 and 3). Another option is to equip the cart with an animal manipulation apparatus 46, such as a weigh scale, a small calf hoist, or the like. The apparatus is preferably supported from a transverse bracket 48 mounted between the tops of the sides 28, 30.

Figure 8:
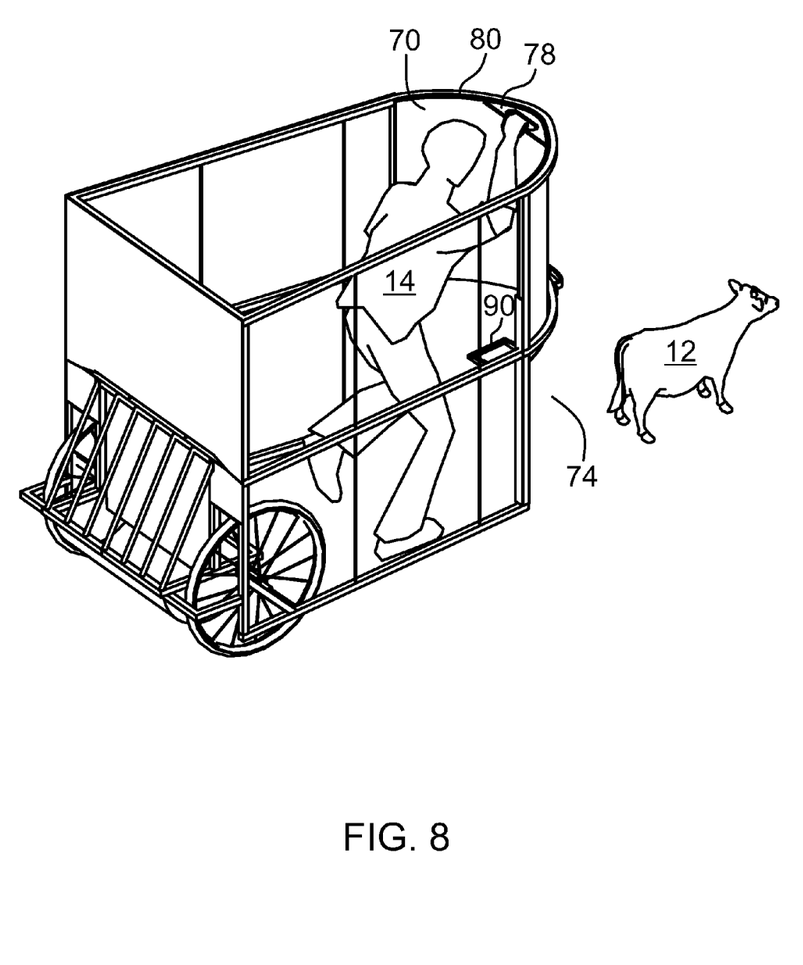
FIG. 8 shows the cart of FIG. 2 where a gate at the front end is raised by the operator for enhanced clearance over the standing calf that is being approached for capture.

Referring now to the opposed front end 24 of the cart, a shield 60 is fixed to the upper portion of the frame above a liftable gate 70. In the preferred embodiment the shield is made of a resilient material mounted to the outwardly bowed frame 20. The shield 60 has a number of spaced view ports 62 to enable the operator to see ahead and peripherally to some extent. The bottom gate 70 is of complimentary shape to the shield, and its vertical edges 72 are mounted to corresponding vertical tracks 73 on the frame that allow the gate to slide vertically past the inside surface 64 of the shield 60 between lowered and raised positions (FIGS. 2 and 8, respectively). In an alternate embodiment, the shield 60 and gate 70 may be made integrally to form a unitary gate spanning the height of the cart, but this is not preferred.

When the gate is raised, or "opened", a front opening 74 or entrance is created into the cart. The opening 74 is "closed" when the gate is lowered to the base of the cart, as seen in FIG. 2. The gate may optionally have one or more view ports 76 which align with one of the shield view ports 62 when the gate is lifted, to allow the operator to continue to see therethrough. A slider handle 78 defines a first hand grip located near an upper edge 80 of the gate which an operator may grasp with one or both hands to lift and lower the gate as desired. When one hand grips the handle 78, the operator's other hand is free to control the cart as shown in FIG. 8.

The front end 24 is also equipped with a pair of opposed second hand grips 90 mounted to the frame inside the enclosure on each side 28, 30 adjacent the front end 24 (as shown in FIG. 5). The grips 90 should be as close as possible to the front of the cart to provide optimal leverage of the cart about the rear axles 42, yet located behind the shield 60 so as not to interfere with the sliding of the gate 70 along the frame's vertical tracks 73. The grips should also be at a suitable height from the cart's base to allow an operator to comfortably hold the grips, to lift the cart's front end and to push the cart when the operator is in an upright standing posture. Preferably, the position of the grips is adjustable, employing a handle bolted onto a plate with multiple aperture spacings (vertically and optionally horizontally) or other known arrangements. Another exterior hand grip 92 is optionally mounted outside the cart to the front end of the frame, to provide the operator an exterior means of manipulating the cart, as when lifting the front end from outside to initiate the operator's entry into the cart. In effect, therefore, the various hand grips contribute to define a control means for the operator's use of the cart.

In use, the operator is able to manipulate the cart in several modes of operation. A first mode of operation allows the operator to propel and guide the cart from within to approach the calf while remaining concealed from the calf and the herd. This "drive" mode is best achieved by the operator using the pair of hand grips 90 to lift the cart's front end 24 off the ground slightly and to drive the cart via the wheels 40 in a desired direction (as in FIG. 5). Navigation is achieved through the view ports 62, and it is preferred that the gate 70 remain in its lowered position to keep the operator concealed when the front end of the cart is brought next to the calf as close as possible, without spooking the calf or the other cattle.

Figure 6:
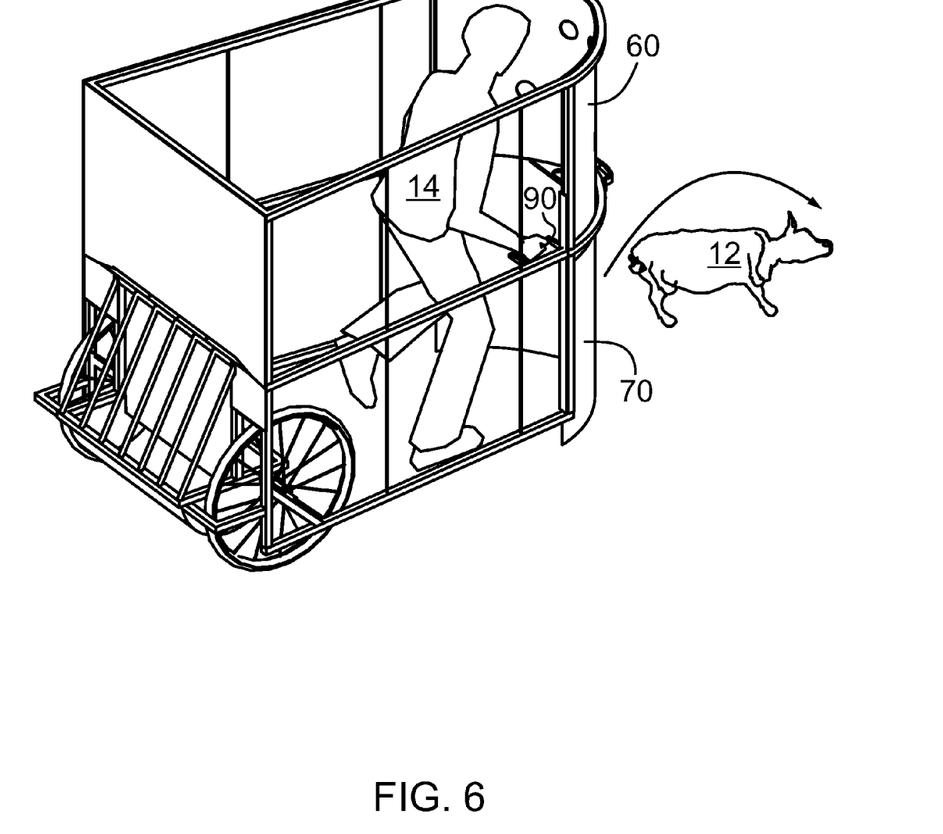
FIG. 6 shows the cart of FIG. 2 in a second capture mode allowing the operator to guide the enclosure over the calf by titling the front end up and moving forward.
Figure 7:
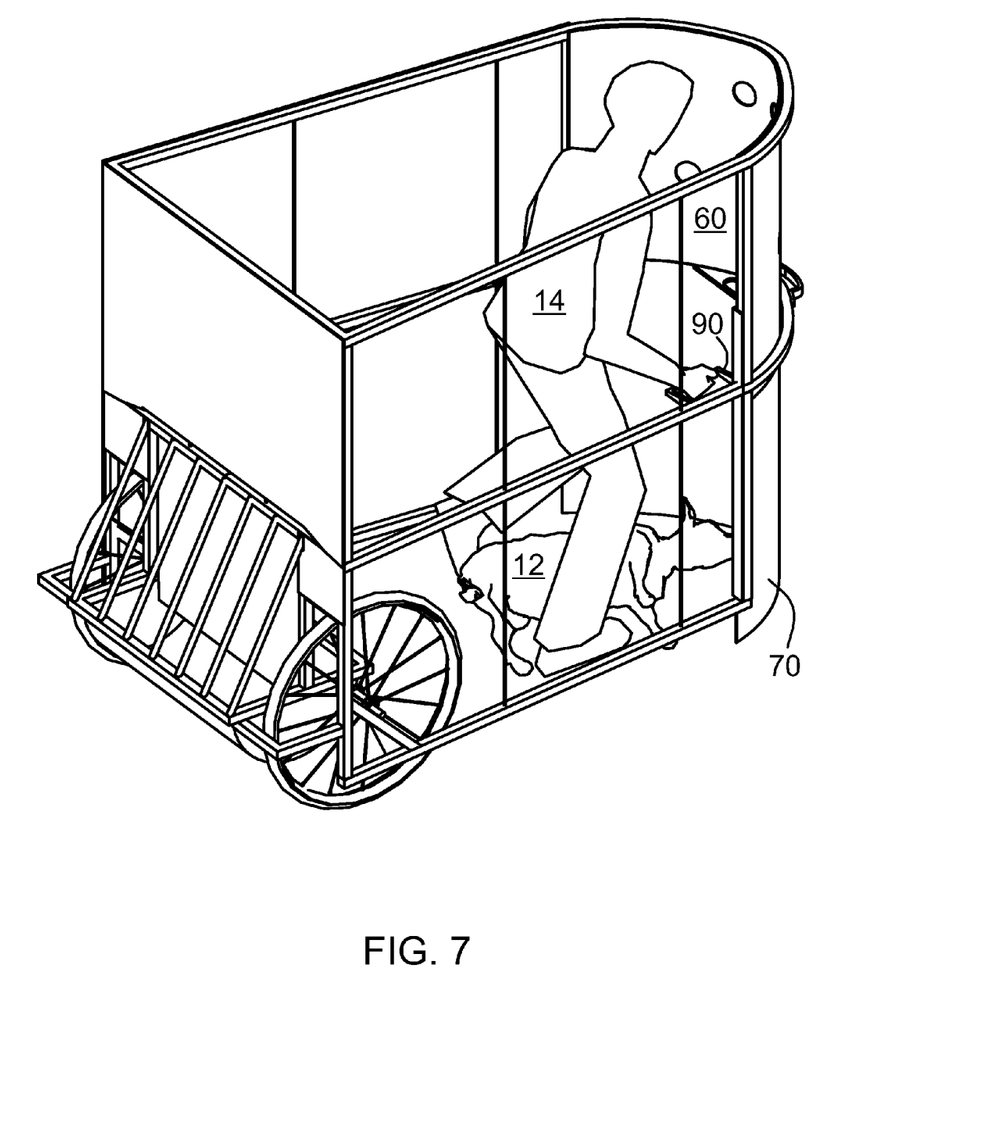
FIG. 7 shows the cart of FIG. 2 in a third treatment mode in which the calf has been captured and concealed within the enclosure after the operator has lowered and rested the front end on the ground, and allowing the operator to treat the captured calf.

A second mode of operation then allows the operator to capture and conceal the calf within the enclosure 22, and thereby isolate the calf from the herd. The operator has several options in this "capture" mode. The first option is shown in FIG. 6 where the gate 70 remains closed and the operator lifts, or tilts, the front end 24 upwardly, using the grips 90, to bring the front end above the calf to be captured. The operator then merely propels, or "walks", the cart forward (as in the drive mode) to bring the cart over the calf, and lowers the front end to the ground to trap the calf within the enclosure (FIG. 7). This option is most appropriate for a calf that is laying down, so as to minimize the required front end lift by the operator.

Figure 9:
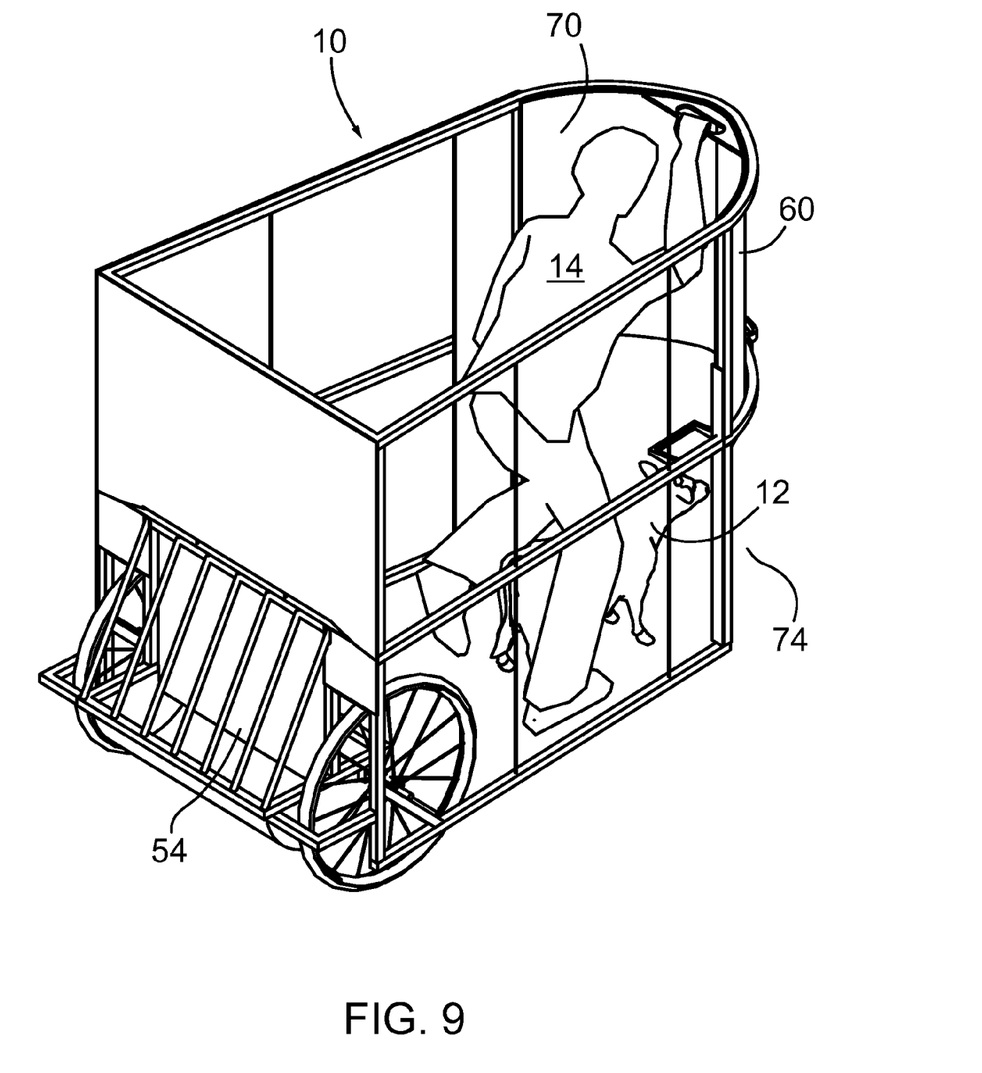
FIG. 9 shows the cart of FIG. 8 where the calf has been brought into the enclosure under the raised gate for capture; and, FIG. 10 shows the cart of FIG. 9 where the gate is lowered to capture the calf within the enclosure to safely isolate the calf and operator from other animals of the herd, including the calf's mother.

The operator's second option is appropriate for a standing calf, as in FIG. 8, where enhanced clearance of the front end over the calf is desired. The operator uses one hand to raise the gate 70 open with the slider handle 78, and with the other hand on one of the grips 90 walks the cart forward (as in the drive mode) to bring the calf into the enclosure through the front opening 74 (see FIG. 9). The operator and then lowers the gate 70 closed to trap the calf within the enclosure, as in FIG. 10. It will be appreciated that in this second option the amount of lift of the front end from the ground is at the discretion of the operator. Typically the calf is of a size that fits through the front opening 74 so that the operator need only lift the front end slightly off the ground to walk the cart forward. However, if the calf is particularly tall, then the operator may have to employ a third option, namely a combination of the first and second options where both the gate is open and the front end must be lifted substantially higher (than for the second option) to fit the calf through the front opening 74.

Following the drive and capture modes of operation, the cart then provides a third "treatment" mode of operation after the cart becomes stationary, or parked, when the operator leaves the front end 24 (and specifically the bottom edges 33 and 82 of the frame and gate, respectively) resting on the ground (as in FIG. 2 where movement is arrested) and releases the hand grips 90 and the slider handle 78. The operator can then immediately attend to the captured calf, to tag or needle it, while remaining better protected from the mother cow, which typically becomes confused and merely walks or runs around the cart not knowing what happened to her calf. Once the operator is finished, the operator may release the calf by either opening the gate or by lifting the front end while backing up the cart to expose the calf. Alternately, the operator may place the calf in the rear basket 50 for transport to another location. While the calf is in the basket, the operator will typically move the screen 54 so that the mother cow can see her calf, and so the mother will follow the cart (and her calf) as the operator moves it to another location. As described earlier, the screen has several positions to provide the operator with the option of remaining concealed or seen by the mother cow, depending on what the operator feels is most appropriate in the circumstances.

Some of the many advantages of the present invention should now be better understood. The self-propelled cart allows an operator to approach and trap a calf unseen from the calf, the calf's mother and the rest of the herd. Once the operator has the calf trapped within the enclosure, both the operator and the calf remain concealed from the mother cow and the rest of the herd. The operator may then immediately attend to the calf, to tag or needle it, while remaining safely protected from the mother cow. Throughout the operator's encounter with a targeted calf the operator is within the protective enclosure and remains safer from attack or injury from the herd.

The above description is intended in an illustrative rather than a restrictive sense, and variations to the specific configurations described may be apparent to skilled persons in adapting the present invention to other specific applications. Such variations are intended to form part of the present invention insofar as they are within the spirit and scope of the claims below.

We claim:

1. A cart for isolating a calf from a herd comprising:
   a rigid frame having opposed front and rear ends each connected to opposed sides defining a protective enclosure with an open base for receiving an operator and the calf concurrently within and opaque panels on each side and end concealing the operator from the herd outside the enclosure;
   an assembly at the rear end to facilitate mobility of the cart by the operator within the enclosure; and,
   a control arrangement for the operator to manipulate the cart manually from within the enclosure between several modes of operation including a drive mode wherein hand grips inside the enclosure and at least one view port in at least one opaque panel at the front end allow the operator in the enclosure to move and guide the cart toward the calf, a capture mode wherein the hand grips allow the operator in the enclosure to vertically manipulate the front end sufficiently to capture and conceal the calf within the enclosure thereby isolating the calf from the herd, and a treatment mode wherein the open base and a basket at the rear end allow the operator in the enclosure to treat the captured calf within the enclosure and then release or move the captured calf to another location.

2. The cart of claim 1 wherein at least one of the opaque panels at the front end defines a liftable gate slideable by the operator in the enclosure between a lowered position to conceal the operator from the herd and a raised position to enhance clearance of the front end over the calf in the capture mode.

3. The cart of claim 2 wherein at least one of the opaque panels at the front end further comprises another opaque panel fixed above the liftable gate and at least one aperture therein provides the operator with a view out of the enclosure in at least the drive mode.

4. The cart of claim 3 wherein the hand grips are mounted to the frame proximate the front end, each hand grip being position adjustable to suit the operator.

5. The cart of claim 3 wherein the basket is positioned to provide the operator with unobstructed access thereto from inside the enclosure and includes a security arrangement comprising a plurality of spaced bars arranged to prevent escape of the calf from the cart through the rear end.

6. The cart of claim 5 further including a screen at the rear end capable of being placed in positions wherein the basket content but not the enclosure is visible from outside the cart and wherein the basket content and enclosure are visible from outside the cart.

7. The cart of claim 1 wherein the hand grips are mounted to the frame proximate the front end, each hand grip being position adjustable to suit the operator.

8. The cart of claim 1 wherein the basket is positioned to provide the operator with unobstructed access thereto from inside the enclosure and includes a security arrangement comprising a plurality of bars arranged to prevent escape of the calf from the cart through the rear end.

9. The cart of claim 8 further including a screen at the rear end capable of being placed in positions wherein the basket content but not the enclosure is visible from outside the cart and wherein the basket content and enclosure are visible from outside the cart.

10. The cart of claim 1 further including an opaque screen at the rear end capable of being placed in at least a position wherein the basket content but not the enclosure is visible from outside the cart.

11. A cart for isolating a calf from a herd comprising a rigid frame having opposed front and rear ends each connected to opposed sides defining an opaque protective enclosure with an open base for receiving an operator within and concealing the operator from the herd outside the enclosure, the front end having an opaque upper portion with at least one view port for the operator and an opaque lower portion vertically moveable relative to the upper portion, and an operating arrangement for the operator to manipulate the cart manually from within the enclosure between several modes including a drive mode wherein a wheeled assembly secured to the frame facilitates mobility of the cart by the operator toward the calf, a capture mode wherein the opaque lower portion of the front end has a raised position relative to the upper portion to allow the operator to capture the calf by walking the enclosure over the calf and a lowered position to capture the calf once within the enclosure, and a treatment mode wherein the open base allows the operator in the enclosure to treat the captured calf within the enclosure before releasing the calf.

12. The cart of claim 1 wherein the front end is adapted to be elevated by the operator in the enclosure above the calf and to be lowered to trap the calf within the enclosure in the capture mode while the opaque lower portion is in the lowered or raised positions.

13. The cart of claim 12 wherein the opaque lower portion has at least one view port which aligns with the at least one view port in the opaque upper portion when the lower portion is in the raised position.

14. The cart of claim 12 wherein the operating arrangement includes at least a pair of hand grips mounted to the frame proximate the front end, each hand grip being position adjustable to suit the operator.

15. The cart of claim 14 further including a basket at the rear end positioned to provide the operator with unobstructed access thereto from inside the enclosure for receiving the captured calf after the treatment mode.

16. The cart of claim 15 wherein the basket includes an arrangement of obstructing members mounted at the rear end adjacent the basket to prevent access into and out of the cart through the rear end.

17. The cart of claim 16 further including a screen at the rear end capable of being placed in at least a position wherein the basket content but not the enclosure is visible from outside the cart.

18. The cart of claim 11 wherein the operating arrangement includes at least a pair of hand grips mounted to the frame proximate the front end, each hand grip being position adjustable to suit the operator.

19. The cart of claim 11 further including a basket at the rear end positioned to provide the operator with unobstructed access thereto from inside the enclosure for receiving the captured calf after the treatment mode.

20. The cart of claim 11 further including a screen at the rear end capable of being placed in at least a position wherein the basket content but not the enclosure is visible from outside the cart.

* * * * *